(12) United States Patent
Kurtz

(10) Patent No.: US 6,401,541 B1
(45) Date of Patent: Jun. 11, 2002

(54) MULTIPLE PRESSURE SENSING SYSTEM

(75) Inventor: Anthony D. Kurtz, Ridgewood, NJ (US)

(73) Assignee: Kulite Semiconductor Products, Inc.

( * ) Notice: Subject to any disclaimer, the term of this patent is extended or adjusted under 35 U.S.C. 154(b) by 0 days.

(21) Appl. No.: 09/432,467

(22) Filed: Nov. 3, 1999

(51) Int. Cl.$^7$ .......................... G01L 13/02; G01L 7/00
(52) U.S. Cl. .......................................... 73/716; 73/756
(58) Field of Search .................. 73/720, 721, 723, 73/725, 726, 727, 756, 716, 717, 718, 719; 340/870.37

(56) References Cited

U.S. PATENT DOCUMENTS

| | | | |
|---|---|---|---|
| 3,739,644 A | * 6/1973 | Underwood et al. .... | 73/398 AR |
| 4,192,005 A | 3/1980 | Kurtz | |
| 4,528,855 A | * 7/1985 | Singh .......................... | 73/721 |
| 4,630,227 A | * 12/1986 | Hagenbuch .................. | 364/567 |
| 4,753,105 A | * 6/1988 | Juanarena et al. ............ | 73/4 R |
| 4,872,349 A | * 10/1989 | Espiritu-Santo .............. | 73/727 |
| 5,101,829 A | * 4/1992 | Fujikawa et al. ............ | 128/672 |
| 5,451,940 A | * 9/1995 | Schneider et al. ..... | 340/870.37 |
| 5,954,089 A | * 9/1999 | Seyour ..................... | 137/487.5 |

* cited by examiner

*Primary Examiner*—Benjamin R. Fuller
*Assistant Examiner*—Abdullahi Aw-Musse
(74) *Attorney, Agent, or Firm*—Duane Morris LLP; Arthur L. Plevy

(57) ABSTRACT

A method for measuring multiple pressures and a pressure sensing system for accomplishing the same. The method for measuring a plurality of pressures includes, exposing each of a plurality of pressure sensors to a corresponding plurality of environments each having a corresponding pressure to be measured, determining how frequently to measure each of the plurality of pressures, determining a sequence for utilizing the pressure sensors to measure the corresponding plurality of pressures, the sequence being dependent upon the determined frequency for each of the plurality of pressures and selectively utilizing each of the plurality of pressure sensors according to the determined sequence to measure the pressure to which it is exposed.

17 Claims, 2 Drawing Sheets

MULTIPLE PRESSURE SENSING SYSTEM

FIELD OF INVENTION

The present invention relates to pressure transducers, and more particularly to a method and pressure sensing system which corrects for errors of multiple pressure transducers each of which can be exposed to a unique environment of varying degrees of hostility.

BACKGROUND OF INVENTION

In general, the use of piezoresistive, and in particular Wheatstone bridge, structures as pressure transducers is well known. Further, piezoresistive pressure sensors are used in many applications where they are exposed to fluctuating pressures to be measured at extreme temperatures. However, as is also known, as temperature fluctuates, so may the output of the transducer as the gage factor and resistivity of the sensor are both functions of temperature. Where these fluctuations are substantial enough to introduce a non-negligible error for the intended application, it is desirable to compensate for, or correct the induced error. A typical application where the temperature-induced error becomes non-negligible is aerospace applications, where a sensor can be subjected to extremely high pressures and extreme temperatures.

It is well known in the art the resistance of a Wheatstone bridge increases with increasing temperature and that the gage factor, which is the percentage change of resistance with increasing strain, decreases with increasing temperature. Thus, for a constant voltage applied to the bridge, the decrease in gage factor with increasing temperature leads to a decrease in bridge output at a given pressure. However, by putting a non-temperature varying resistor in series with the bridge, as the temperature of the bridge increases its resistance increases, and more of the supply voltage appears across the bridge. However, not only is the drop of the gage factor and thus the inherent change of the bridge output with constant bridge-excitation non-linear with increasing temperature, but the basic compensation technique of using a resistance divider is somewhat non-linear leading to a not-perfect compensation.

These problems can be overcome using an approach such as that illustrated in commonly assigned U.S. Pat. No. 4,192,005, entitled COMPENSATED PRESSURE TRANSDUCER EMPLOYING DIGITAL PROCESSING TECHNIQUES, the entire disclosure of which is hereby incorporated by reference. However, in the previous work a single digital correction circuit was required for each transducer and it was assumed each circuit would be attached to each transducer. Thus, the prior art approaches yield undesirably increased weight and cost for temperature compensated, or corrected, devices. It is desirable and an object of the present invention to provide a single error correcting system for use with multiple pressure sensors, and more particularly piezoresistive bridge pressure sensors, each of which can be exposed to unique environment. Each of the unique environments are at an associated temperature and have an associated pressure to measured by the sensor. In the preferred embodiment a degree of hostility varies between the unique environments. It is a further object of the present invention that the single error correcting system be functional with a number of devices which are not necessarily identical, and which are preferably adapted to measure different pressure ranges at different temperatures at different frequencies of measurement (i.e. some more often than others).

SUMMARY OF INVENTION

A method for measuring multiple pressures and a pressure sensing system for accomplishing the same. The pressure sensing system adapted for measuring a plurality of pressures includes: a plurality of pressure sensing assemblies each adapted to measure a corresponding pressure and be exposed to a respectively associated environment; a microcontroller; and, means for selectively coupling each of the plurality of pressure sensing bridge assemblies to the microcontroller in a predetermined sequence, wherein the means for selectively coupling are responsive to the microcontroller.

The method for measuring a plurality of pressures includes: exposing each of a plurality of pressure sensors to a corresponding plurality of environments each having a corresponding pressure to be measured; determining how frequently to measure each of the plurality of pressures; determining a sequence for utilizing the pressure sensors to measure the corresponding plurality of pressures, the sequence being dependent upon the determined frequency for each of the plurality of pressures; and, selectively utilizing each of the plurality of pressure sensors, according to the determined sequence, to measure the pressure to which it is exposed.

DETAILED DESCRIPTION OF THE INVENTION

Basically, according to the instant invention, a plurality of pressure transducers each adapted to be exposed to a respectively associated environment are coupled to a single remote processor. It should be understood that as each of the transducers are adapted to be exposed to what may be radically different environments, they may have very different ranges of proper operation. For example, aerospace applications often call for several pressure transducers each of which is exposed to a unique environment and is designed to measure a particular pressure range. In such an application some pressure transducers may be present in an engine where they will need to monitor pressures at very high temperatures relatively frequently, while others having completely disparate measurement ranges are positioned so as to measure hydraulic pressures at relatively low temperatures relatively infrequently for example. Each transducer may have an input to the remote processor, or preferably, the transducers are sequentially coupled to the processor using at least one switch controlled by the remote processor which alternates an input between the transducers. One of the advantages of this configuration is that a resistor can be serially coupled to each pressure sensor (i.e. Wheatstone bridge). Thus, by measuring the voltage drop across the resistor, or alternatively the bridge directly, the temperature of the bridge can be determined. Because the processor is remotely located, the transducer can function in a very high temperature environment (i.e., greater than 600° F. for example) and the processor can not only operate to monitor the output of the transducer but, by knowing the temperature to which it is exposed, can essentially correct for errors introduced due to exposure to the high temperatures.

Figure 1:
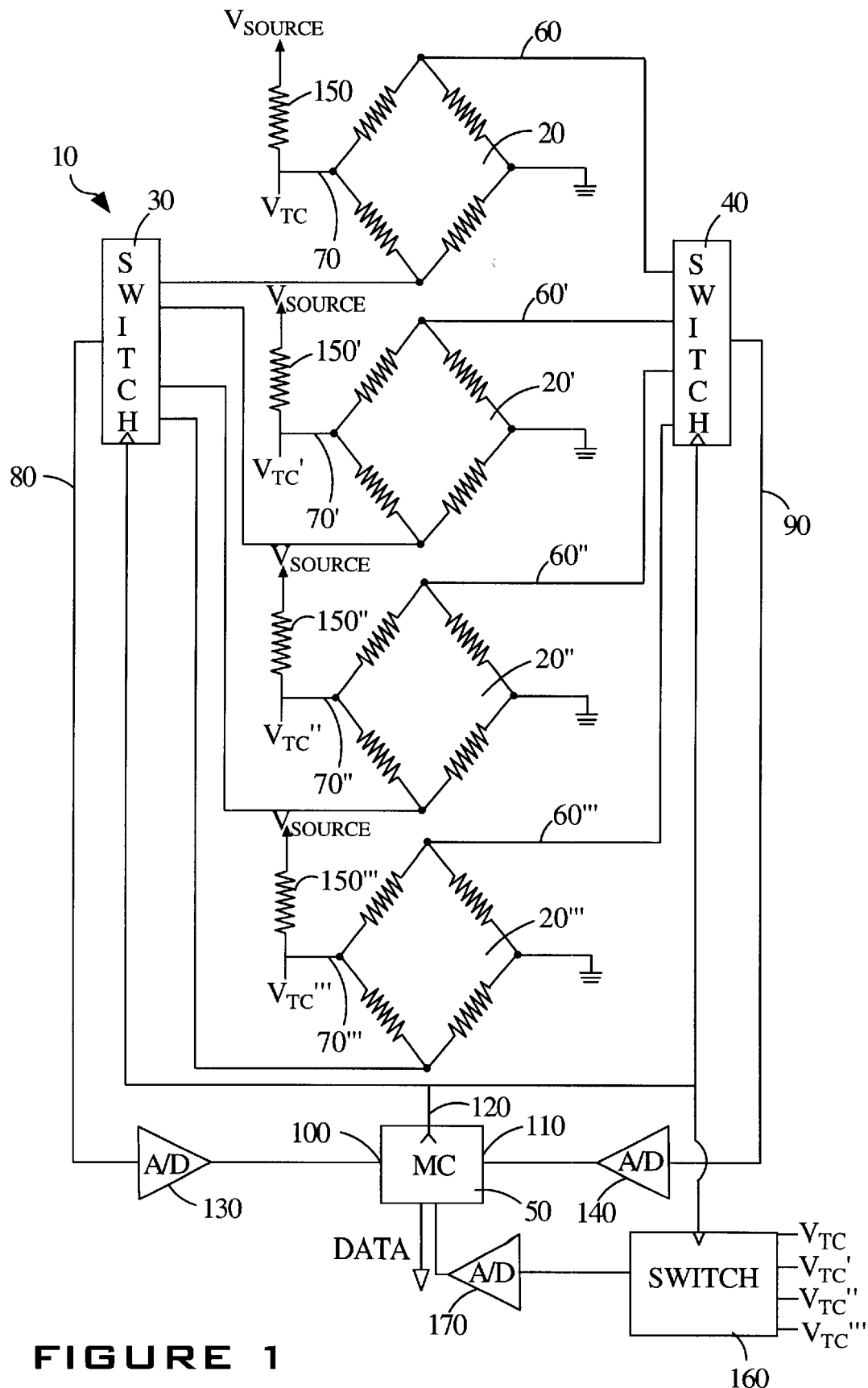
FIG. 1 illustrates a block diagram of a pressure sensing system according to the present invention.

Referring now to the figures, wherein like references refer to like elements of the invention, FIG. 1 illustrates a block diagram of a pressure sensing system 10 according to the present invention. The system 10 includes a plurality of piezoresistive bridge networks 20, 20', 20" and 20'". The particularly illustrated system 10 includes four (4) piezoresistive bridge networks, however it should be understood the number of piezoresistive bridge networks which can be utilized in the system 10 is not limited thereto, and that the choice of four (4) is solely for purposes of illustration. The system 10 further includes switches 30 and 40 and microcontroller 50. Each of the piezoresistive networks is respectively coupled to a first lead 60, 60', 60" and 60'" and a second lead 70, 70', 70", and 70'". The leads 60, 60', 60" and 60'" are further coupled to a first side of switch 40 and leads 70, 70', 70" and 70'" are further coupled to a first side of switch 30. The switches 30, 40 each include a second side respectively coupled to inputs 100, 110 of the microcontroller 50 via leads 80 and 90. Each of the switches 30, 40 are respectively electronically coupled to microcontroller 50 and responsive to a control signal output from the microcontroller 50 via control line 120. In this way, the microcontroller 50 controls which of the transducers 20, 20', 20" or 20'" an output is measured from via the leads 80, 90 (by selectively coupling the transducers thereto with the switches 30, 40). The embodiment 10 of the present invention is further illustrated to include analog to digital (A/D) converters 130, 140 respectively serially interconnected between the switches 30, 40 and the microcontroller 50. These A/D converters 130, 140 serve to digitize the output of the transducers 20, 20', 20" and 20'" for input into the microcontroller 50. Alternatively, if the microcontroller 50 is adapted to directly receive analog signal inputs the A/D devices 130, 140 could be omitted.

Figure 2:
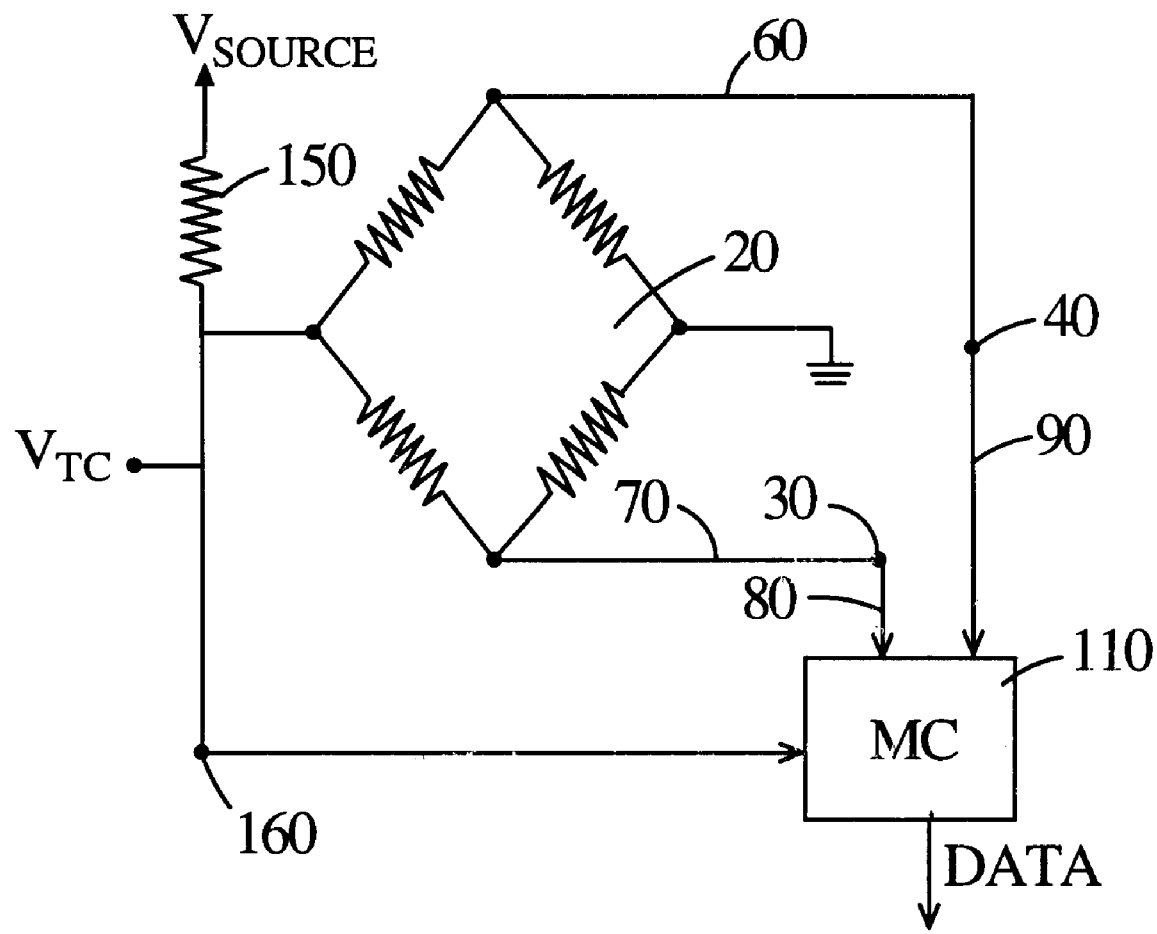
FIG. 2 illustrates a block diagram of a pressure sensing system according to the present invention in a first mode of operation.

According to the present invention, the microcontroller 50 may be programmed to sequentially measure pressures which the transducers 20, 20', 20" and 20'" are exposed to, in that order (or for that matter, any other order as well). To effectuate such, the microcontroller 50 first outputs a first control signal on the control line 120 which is received by the switches 30, 40. Referring now also to FIG. 2, responsively thereto, the switch 30 couples lead 70 to lead 80 and switch 40 couples lead 60 to lead 90, thereby electronically coupling the first transducer 20 to the microcontroller 50. After appropriate measurements and calculations have been performed for the first transducer 20 as are well known (by measuring the output of the bridge 20 and determining the temperature of the bridge 20 using the voltage drop across the resistor 150 (or bridge 20) for example), a second control signal is output by the microcontroller 50 on the control line 120.

This second control signal is received by the switches 30, 40 which now couple lead 70' to lead 80 and lead 60' to lead 90, thereby inputting signals from the second transducer 20' into the microcontroller 50. After appropriate measurements and calculations have been performed for the second transducer 20', a third control signal is output by the microcontroller 50 on the control line 120. This third control signal is received by the switches 30, 40 which now couple lead 70" to lead 80 and lead 60" to lead 90, thereby inputting signals from the third transducer 20" into the microcontroller 50. After appropriate measurements and calculations have been performed for the third transducer 20", a fourth control signal is output by the microcontroller 50 on the control line 120. This fourth control signal is received by the switches 30, 40 which now couple lead 70'" to lead 80 and lead 60'" to lead 90, thereby inputting signals from the fourth transducer 20'" into the microcontroller 50. After appropriate measurements and calculations have again been performed for the fourth transducer 20'", the microcontroller 50 outputs the first control signal on the control line 120 and the process repeats, for example.

Advantageously, this permits programming of the microcontroller to provide measurements of the different transducers at different frequencies of time. For example, in the above example each of the transducers are measured with a same frequency, i.e. 1-2-3-4-1-2-3-4-1 . . . . However, if the pressure to which the first transducer is exposed to should be measured more often than the pressures applied to the second, third and fourth transducers, this can be easily accomplished by reprogramming the controller to measure 1-2-1-3-1-4-1 . . . by outputting the first control signal, then the second, then the first, then the third, then the first, then the fourth, then the first . . . . As set forth, this may be highly advantageous in aerospace applications for example.

It should be recognized that each of the transducers 20, 20', 20" and 20'" can be respectively exposed to a separate environment. This environment may be a high-temperature and high-pressure environment. Thus, the desired correction of the output of one transducer 20, 20', 20", 20'" may be drastically different from that of another, as each of the transducers may be exposed to drastically different temperatures and pressures which cause different errors.

Basically, the temperature measurement can be effected through use of a resistor serially coupled to each bridge 20, 20', 20", 20'", for example temperature compensation resistors 150, 150', 150" and 150'", switch 160 and optionally A/D converter 170.

When the transducers 20, 20', 20" and 20'" are individually exposed to a respective pressure to be measured at a respective temperature, as set forth each transducer 20, 20', 20" and 20'" individually exhibits a variance in the gage factor and resistivity. By calculating the voltage drop across the bridge 20, 20', 20" and 20'" which is coupled to the microprocessor 50, the temperature to which it is exposed can be determined and corrected for. Because the bridge excitation voltage $V_{source}$ is known, the voltage drop across each bridge 20, 20', 20" and 20'" can be either directly measured or calculated by measuring $V_{tc}=V_{source}-V_{tc}$). In one embodiment, to calculate the respective temperature to which a bridge (20, 20', 20" and 20'") is exposed to, so as to be able to properly correct the output of that bridge, the voltage drop ($V_{source}-V_{tc}$) for that bridge is calculated by the microcontroller 50 by inputting the voltage $V_{tc}$ to a first side of switch 160. The second side of switch 160 is input to the microcontroller 50. The switch 160 is controlled by the microcontroller 50 by also coupling it to the control line 120 so it is fed the same control signal as was provided to the switches 30 and 40. Therefore, when the microcontroller 50 outputs the first control signal on the control line 120, $V_{tc}$ is supplied to the microcontroller 50 using switch 160 so the temperature to which bridge 20 is exposed can be determined and properly compensated for (See FIG. 2 also). Likewise, as the switch 160 is coupled to the control line 120, the appropriate voltages $V_{tc}'$, $V_{tc}"$, $V_{tc}'"$ are sequentially applied to the microcontroller for each bridge 20', 20" and 20'". As with the leads 80, 90, A/D converter 170 is serially interconnected between the switch 160 and microcontroller 50 to enable the voltages $V_{tc}$, $V_{tc}'$, $V_{tc}"$, $V_{tc}'"$ to be applied to the microcontroller 50. Alternatively, if the microcontroller 50 is adapted to directly receive analog signals, the A/D converter 170 can be omitted.

It should further be recognized, other errors can be corrected according to the present invention as well, for example non-linear responses of the bridges, etc., by proper programming of the microprocessor. Such induced errors can include for example a zero error, a span error, an environment induced zero error and an environment induced span error. For example, a lookup table could be provided for each transducer, and a corresponding table utilized when a particular transducer's output is being read by the microprocessor. In the illustrated form, resistors 150, 150', 150", 150''' are respectively serially coupled to each of the bridges 20, 20', 20" and 20'''. Alternatively, a single resistor 150 can be coupled to the source voltage $V_{source}$ and switchably connected to the bridges 20, 20', 20" and 20''' such that the bridges 20, 20', 20" and 20''' are sequentially excited responsively to the microcontroller 50 when an output is to be read therefrom and the corresponding voltage $V_{tc}, V_{tc}', V_{tc}'', V_{tc}'''$ is simultaneously provided to the microcontroller 50.

Although the invention has been described and pictured in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claim, whatever features of patentable novelty exist in the invention disclosed.

I claim:

1. A pressure sensing system adapted for measuring a plurality of pressures, said system comprising:
    a plurality of pressure sensing assemblies each positioned to be exposable to a corresponding one of a plurality of discrete environments exhibiting a corresponding one of said plurality of pressures to be measured and varying in at least one degree of hostility;
    a microcontroller; and,
    at least one switching device coupled between each of said plurality of pressure sensing assemblies and said microcontroller for selectively coupling each of said plurality of pressure sensing assemblies to said microcontroller in a predetermined sequence responsively to said microcontroller, wherein each of said pressure sensing assemblies includes first and second outputs, and said at least one switching device comprises a first switching device coupled between said first output of each of said plurality of pressure sensing assemblies and said microcontroller and a second switching device coupled between said second output of each of said plurality of pressure sensing assemblies and said microcontroller.

2. The system of claim 1, further comprising a control line coupled to said first and second switching devices and said microcontroller, wherein said microcontroller outputs a control signal via said control line being indicative of one of said plurality of pressure sensing assemblies, and said first and second switching devices couple said one of said plurality of pressure sensing assemblies to said microcontroller responsively to said control signal.

3. The system of claim 2, wherein said microprocessor includes a plurality of memory addresses having instructions stored thereat for correcting for inherent errors associated with each of said plurality of pressure sensing assemblies.

4. The system of claim 3, further comprising a plurality resistors each respectively coupled to a corresponding one of said plurality of pressure sensing assemblies and for monitoring a voltage drop across said corresponding pressure sensing assembly.

5. The system of claim 4, further comprising at least one compensation switching device for selectively coupling one of said resistors to said microcontroller and being coupled between each of said resistors and said microcontroller.

6. The system of claim 5, wherein said at least one compensation switching device is further electronically coupled to said control line and responsive to said control signal to electronically couple at least one of said plurality of resistors corresponding to said one of said plurality of pressure sensing assemblies to said microcontroller.

7. The system of claim 1, wherein the respective degree of hostility of each of said plurality of environments may cause an error in an output of said respectively associated pressure sensing assembly, said microcontroller includes means for correcting at least one of said errors, and said microcontroller is exposed to an environment having a relatively mild degree of hostility as compared to at least one of said plurality of environments.

8. The system of claim 7, wherein said inherent errors associated with each of said plurality of pressure sensing assemblies are selected from the group consisting of: a zero error, a span error, an environment induced zero error and an environment induced span error.

9. The system of claim 1, further comprising at least one memory coupled to said microcontroller and for storing at least one lookup table having a plurality of data entries each respectively associated with at least one of said plurality of pressure sensing assemblies and a temperature, wherein said microcontroller utilizes a select one of said data entries to correct an output of one of said associated pressure sensing assemblies.

10. The system of claim 1 wherein said predetermined sequence is dependent upon a determined frequency for measuring each of said plurality of pressures.

11. The system of claim 1, wherein each of said pressure sensing assemblies comprises a piezoresistive bridge assembly.

12. A method for measuring a plurality of pressures comprising the steps of:
    exposing each of a plurality of pressure sensors to a corresponding one of a plurality of discrete environments varying in degree of hostility and each exhibiting a corresponding one of said pressures to be measured;
    determining how frequently to measure each of said corresponding pressures with said pressure sensors;
    determining a sequence for utilizing said pressure sensors to measure said corresponding plurality of pressures, said sequence being dependent upon said determined frequency for measuring each of said corresponding pressures; and,
    selectively coupling each of said plurality of pressure sensors to a microcontroller according to said determined sequence.

13. The method of claim 12, wherein said step of selectively coupling each of said plurality of pressure sensors comprises sequentially electronically coupling each of said plurality of pressure sensors to said microcontroller according to said determined sequence.

14. The method of claim 12, wherein the respective degree of hostility of at least one of said plurality of environments may cause an error in measuring said corresponding pressure thereof, and said method further comprises the steps of:
    generating a first value at least partially indicative of a first of said corresponding pressures utilizing said microcontroller and a first of said pressure sensors, wherein said first pressure sensor is exposed to a first of said plurality of environments having said first corresponding pressure;

determining a first degree of hostility of said first environment; and, adjusting said first value responsively to said determined first degree of hostility using said microcontroller.

15. The method of claim 14, further comprising the step of:

generating a control signal to which said selective coupling is responsive to.

16. The method of claim 14, further comprising the step of:

generating a second value at least partially indicative of a second of said corresponding pressures utilizing said microcontroller and a second of said pressure sensors, wherein said second pressure sensor is exposed to a second of said plurality of environments having said second corresponding pressure;

determining a second degree of hostility of said second environment; and, adjusting said second value responsively to said determined second degree of hostility using said microcontroller.

17. The method of claim 16, wherein said step of adjusting said first value is independent of said step of adjusting said second value.

* * * * *